US012241506B2

(12) United States Patent
Bertolini et al.

(10) Patent No.: US 12,241,506 B2
(45) Date of Patent: Mar. 4, 2025

(54) BEARING UNIT WITH ROLLING BODIES FOR USE IN THE FOOD AND BEVERAGE INDUSTRY

(71) Applicant: AKTIEBOLAGET SKF, Götenborg (SE)

(72) Inventors: Andrea A. Bertolini, Carrara (IT); Alessio Nebbia Colomba, Pisa (IT); Fausto Baracca, Massa (IT); Pasquale Frezza, Aversa (IT)

(73) Assignee: Aktiebolaget SKF, Gothenburg (SE)

( * ) Notice: Subject to any disclaimer, the term of this patent is extended or adjusted under 35 U.S.C. 154(b) by 66 days.

(21) Appl. No.: 18/214,554

(22) Filed: Jun. 27, 2023

(65) Prior Publication Data
US 2024/0003388 A1    Jan. 4, 2024

(30) Foreign Application Priority Data

Jul. 4, 2022  (IT) .................. 102022000014071

(51) Int. Cl.
*F16C 19/06* (2006.01)
*F16C 33/78* (2006.01)

(52) U.S. Cl.
CPC .......... *F16C 33/7886* (2013.01); *F16C 19/06* (2013.01); *F16C 33/7816* (2013.01); *F16C 33/7889* (2013.01); *F16C 2208/04* (2013.01); *F16C 2223/42* (2013.01); *F16C 2223/44* (2013.01)

(58) Field of Classification Search
CPC ...... F16C 19/06; F16C 23/082; F16C 23/084; F16C 33/586; F16C 33/7816; F16C 33/7886; F16C 33/7889; F16C 35/073; F16C 2208/04; F16C 2223/42; F16C 2223/44
See application file for complete search history.

(56) References Cited

U.S. PATENT DOCUMENTS 6,062,735 A    5/2000  Ward

FOREIGN PATENT DOCUMENTS

| DE | 102017115978 A1 | * 11/2018 | ............. F16C 33/62 |
| JP | S5510111 | 1/1980 | |
| JP | 59170523 A | * 9/1984 | ............. F16C 19/52 |

OTHER PUBLICATIONS

International Search Report for corresponding Italy Patent Application No. 102022000014071 dated Jan. 25, 2023.

* cited by examiner

*Primary Examiner* — Phillip A Johnson
(74) *Attorney, Agent, or Firm* — Stinson LLP

(57) ABSTRACT

A bearing unit with rolling bodies for use in the food and beverage industry, for example. The bearing unit may have a high resistance to wear and to corrosion and may have a radially outer ring, stationary, a radially inner ring, rotatable with respect to an axis of rotation (X), and a sealing and protection device mounted on the radially inner ring and on opposite sides of the radially outer ring, both to protect the radially outer ring from the action of external contaminants and to prevent any such external contaminants from getting into a gap between the radially outer ring and the radially inner ring. The bearing unit may further have protective layer being arranged in contact with the radially inner ring, and being made of composite polymeric material to isolate and protect the radially inner ring from external contaminants.

11 Claims, 1 Drawing Sheet

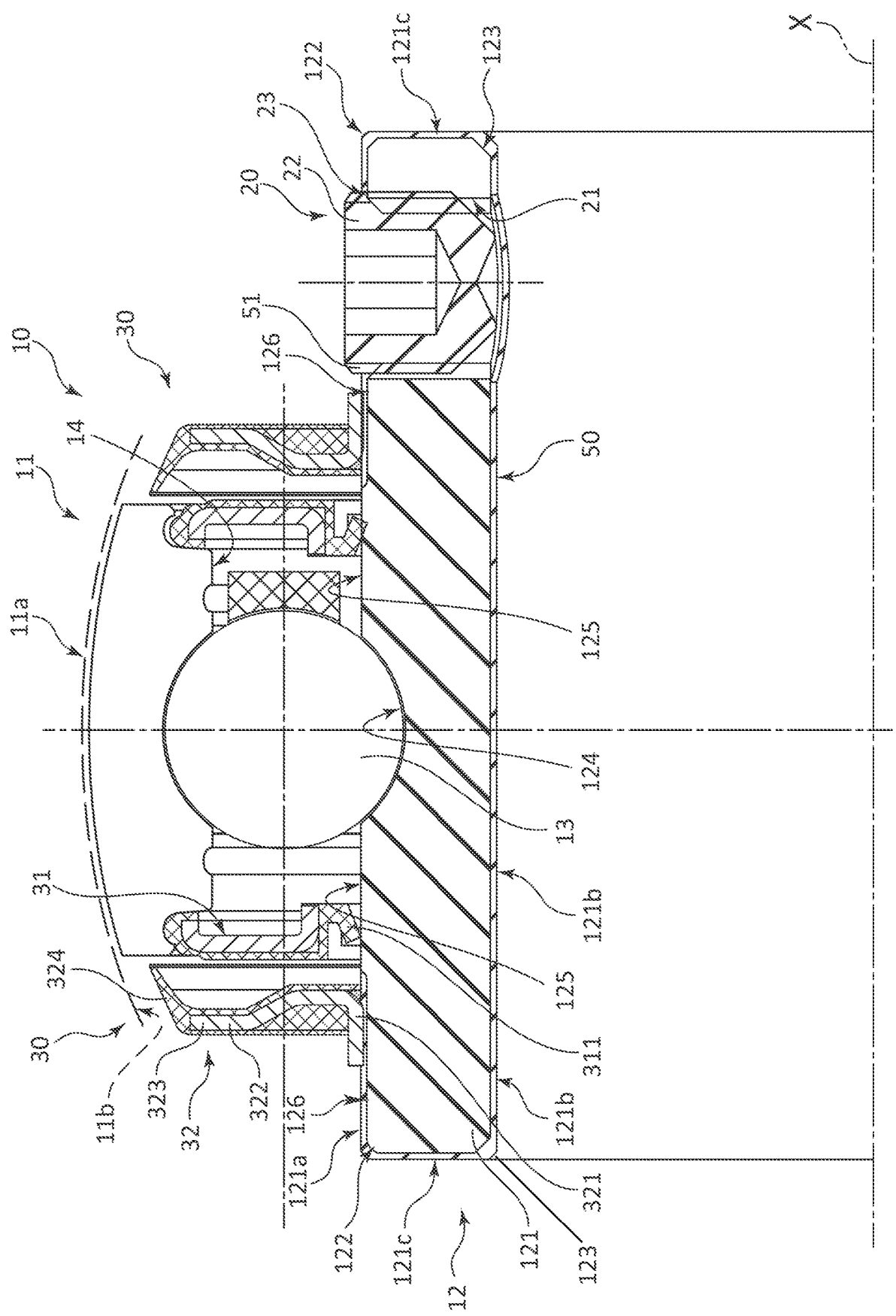

BEARING UNIT WITH ROLLING BODIES FOR USE IN THE FOOD AND BEVERAGE INDUSTRY

CROSS-REFERENCE TO RELATED APPLICATIONS

This application is based on and claims priority to Italian Patent Application No. 102022000014071 filed on Jul. 4, 2022, under 35 U.S.C. § 119, the disclosure of which is incorporated herein by reference in its entirety.

BACKGROUND

The present disclosure relates to a bearing unit with rolling bodies for use in the food and beverage industry.

A focus of bearing units with rolling bodies is to allow relative movement of a first component, usually a rotary shaft, with respect to a second component, usually a frame. Bearing units may include a convex radially outer ring for supporting any initial static misalignment of the shaft with respect to the frame, a larger radially inner ring having a securing device, a plurality of rolling bodies interposed between the outer ring and the inner ring for relative rotation of the inner ring with respect to the outer ring, and a sealing and protection device mounted on the inner ring and on opposite sides of the outer ring, both to protect the outer ring from the action of external contaminants and to prevent any such external contaminants from getting into a gap between the outer ring and the inner ring.

BRIEF DESCRIPTION OF THE DRAWING

The disclosure will now be described with reference to the attached drawing, which illustrates non-limiting exemplary embodiments of the disclosure, in which:

FIG. 1 is a side cross-sectional view of a bearing unit according to exemplary embodiments of the present disclosure.

DETAILED DESCRIPTION

In typical bearing units, both the outer ring and the inner ring are made of steel, or better still stainless steel since they are to be used in the food and beverage industry, but while the outer ring is to some degree protected from the action of external contaminants, including washing water typically used in the food and beverage industry, by means of the sealing and protection device, the inner ring on the other hand is particularly exposed and, in some cases, corrosion can occur on its metal surfaces, this appearing relatively quickly depending on how corrosive the environment is. Such corrosion can lead to contamination of the food.

Preventing the contamination of food is of fundamental importance in the food and beverage industry, and therefore the bearing units used in that industry are made of stainless steel precisely because of its very high performance in terms of corrosion resistance.

However, as the inner and outer rings are subjected to "Hertzian" stresses by the rolling bodies, in order to improve their mechanical strength properties they may first be tempered, something that requires the use of steel with a high carbon content. Unfortunately, the higher the carbon content the lower the corrosion resistance. This problem is not as great in the case of some stainless steels, for example, AISI 300 series steels. However, with these steels it is impossible to attain the necessary mechanical strength properties, in particular surface hardness compatible with the strength required to withstand the abovementioned "Hertzian" stresses.

The present disclosure provides a bearing unit with rolling bodies for use in the food and beverage industry, for example, which has both high mechanical strength vis-a-vis "Hertzian" stresses from the rolling bodies while at the same time offering optimum corrosion resistance.

With reference now to FIG. 1, 10 designates, as a whole, a bearing unit for use in the food and beverage industry, for example, in other words a bearing unit 10 that may necessarily be subjected to frequent washing and sanitizing cycles, and that therefore may have high corrosion resistance properties.

The bearing unit 10 has a central axis of rotation X, and may include, for example, a convex radially outer ring 11; a larger radially inner ring 12 having a securing device a plurality of rolling bodies 13, specifically balls, interposed between the outer ring 11 and the inner ring 12 for relative rotation of the inner ring 12 with respect to the outer ring 11, and a sealing and protection device 30 mounted on the inner ring 12 and on opposite sides of the outer ring 11, both to protect the outer ring 11 from the action of external contaminants and to prevent any such external contaminants from getting into a gap 14 between the outer ring 11 and the inner ring 12.

Throughout the present description and in the claims, terms and expressions indicating positions and orientations, such as "radial" and "axial", are to be understood with reference to the central axis X of rotation of the bearing unit 10.

With reference to FIG. 1, reference sign 13 will designate both individual balls and the row of balls. In this disclosure, the term "ball" may be used by way of example in the present description and in the attached drawing instead of the more generic term "rolling element" (with the same numerical references also being used). Some embodiments and the related drawings may use rolling elements other than balls (for example rollers), without this departing from the scope of the present disclosure.

In some embodiments, the radially outer ring 11 may be delimited radially on the outside by a convex surface 11a suitable for being coupled with a static seat 11b (shown schematically in FIG. 1) with a similar surface to allow possible initial static misalignment, with respect to static seat 11b, of a rotary shaft (not shown) mounted through the radially inner ring 12, which itself has axial dimensions which are larger than the axial dimensions of the radially outer ring 11 and may include a cylindrical body 121 delimited: radially on the outside, by two outer cylindrical surfaces 121a, radially on the inside, by an inner cylindrical surface 121b, and axially, by two annular surfaces 121c.

In some embodiments, the surfaces 121a and 121b may be coaxial with one another and with the axis X, while the annular surfaces 121c may be transverse to the axis X. In some embodiments the annular surfaces 121c may be connected to the relative surfaces 121a by respective rounded annular edges 122, and may be connected to the surface 121b by respective beveled annular edges 123.

In some embodiments, the radially inner ring 12 further may include a raceway 124 for the rolling bodies 13, made in the cylindrical body 121 through one surface 121a of the two surfaces 121a, and two cylindrical mounting seats 125, which may be arranged on opposite sides of the raceway 124 between the relative surfaces 121a and raceway 124 and, as will be described in more detail below, may be engaged by the sealing device 30.

In some embodiments, the securing device 20 may be arranged in a position axially lateral to one of the two cylindrical seats 125 so as to lock the radially inner ring 12 on the shaft (not shown), and may include at least one threaded through hole 21 made through the cylindrical body 121, and at least one headless clamping screw 22 screwed into the hole 21 so as to come into radial abutment against the shaft (not shown). In the bearing unit of the present disclosure, the securing device 20 may include two holes 21, only one of which is shown, arranged at 120° to one another, and a clamping screw 22 for each hole 21. However, the number of holes 21 and screws 22 may vary depending on the radial dimensions of the radially inner ring 12 or of the rotary shaft (not shown). In the rest of the present description, to simplify the text, reference will be made to just one hole 21 and one screw 22, but embodiments of this disclosure are also applicable to other numbers of holes 21 and screws 22.

In some embodiments, the hole 21 may have, from the inlet for the screw 22, in other words from the relative surface 121*a*, an annular bevel 23, while the screw 22 is screwed into the hole 21 in such a way that, in use, it protrudes radially beyond the surface 121*b* enough to engage the rotary shaft (not shown) and lock the radially inner ring 12, both axially and radially, on the rotary shaft (not shown).

The bearing unit 10 of some embodiments, or rather the radially outer ring 11 and the larger radially inner ring 12, may be made of metal, in particular stainless steel for bearings with a carbon content making it possible to attain the necessary hardness of the raceway 124 by means of the usual tempering processes, but not such as to ensure in the long term the necessary resistance to corrosion which, in the food and beverage industry, as it can lead to possible contamination of the food, may be avoided at all costs. To this end, the bearing unit 10 may include a protective layer 50 made of composite polymeric material, preferably, but not necessarily, reinforced rubbery material also having a high resistance to penetration or indentation, in other words a high Shore hardness or, at least, a minimum Shore hardness value of 80.

The polymeric material used to make the layer 50 may also have a color tailored to the specific needs or requests of the end customer and may also be optimized according to the performance required, occasionally prioritizing temperature resistance and mechanical performance over corrosion resistance against most contaminants, but always on the basis of a minimum protection value to be reached by the present disclosure. One example of a reinforced polymeric material, which complies with the above hardness value, is polypropylene with 40% glass fiber (also known as PP GF40). This material has further features that are suitable for the required application. For example, in the case of polypropylene with 40% glass fiber, the water absorption (immersion for 24 hours) is below 0.1%, the flexural modulus is above 7.5 GPa and the tensile strength is above 89 MPa. Polypropylene with 40% glass fiber also has optimum corrosion resistance vis-a-vis the main detergents used in the food and beverage industry.

In some embodiments, the protective layer 50 may be positioned to protect the radially inner ring 12 and may be in contact with the cylindrical surface 121*b*, the annular surfaces 121*c*, in contact also with the cylindrical surfaces 121*a*, but does not cover either the cylindrical mounting seats 125 or the raceway 124. The protective layer 50 may have a very small thickness, no greater than 0.2 mm, and may be produced by co-molding or, alternatively, is deposited on the above parts of the radially inner ring 12 by spraying the composite polymeric material. In some embodiments, the protective layer 50 covers, without interruption, the above parts of the radially inner ring 12, including the rounded annular edges 122 and the beveled annular edges 123, where it has a thickness greater than the 0.2 mm mentioned above in order to give the assembly formed by the protective layer 50 and radially inner ring 12 an absolutely regular external shape without any rough areas or deformation.

To perform its protective function, the protective layer 50 may adhere completely to the radially inner ring 12 and to further improve the capacity for adhesion between the protective layer 50 and the radially inner ring 12 the latter is, before being co-molded or sprayed with the polymeric material, subjected to a surface pre-treatment and covered with a bonding agent, which improves the adhesion between the metal part and the polymeric material. From a structural point of view, the layer 50 would have better properties when it is co-molded than when it is sprayed, but since in the embodiment of the present disclosure this layer 50 has a protective and covering function for corrosion resistance, the two processes are substantially equivalent. The Shore hardness, which is at least 80 as mentioned herein, is an essential feature of the reinforced polymeric material with which the protective layer 50 is produced in order to ensure the assembly of the sealing and protection device 30.

Also according to the present disclosure, to ensure the assembly formed by the protective layer 50 and radially inner ring 12 has an absolutely regular external shape and to prevent any surface discontinuity in the area adjacent to the cylindrical mounting seats 125, each cylindrical surface 121*a* has, for each cylindrical seat 125, a respective radial recess 126 with a radially outer diameter with dimensions smaller than the dimensions of a radially outer diameter of the cylindrical seats 125, in particular dimensions smaller than the maximum of 0.2 mm, in other words the maximum equal to the thickness of the layer 50. With this design, a radially outer surface 50*a* of the layer 50 is coplanar and aligned with the cylindrical seats 125, ensuring dimensional continuity for the whole external part of the radially inner ring 12.

This external dimensional continuity of the radially inner ring 12 is particularly conducive to precise mounting of the sealing and protection device 30 on radially inner ring 12, the device may have, on each side of the radially outer ring 11: an inner sealing shield 31 connected directly to the radially outer ring 11 and having a respective contacting lip 311 arranged in contact with the relative seat 125, and an outer shield 32 mounted on the protective layer 50, adjacent to the relative seat 125.

In some embodiments, the inner sealing shield 31 and the contacting lip 311 may be angularly fixed, as is the radially outer ring 11, and while the shield 31 may be anchored to the radially inner ring 12, the lip 311 may be rigidly secured to the shield 31 and may extend from the shield 31 towards the relative seat 125, coming into sliding contact with seat 125 to create an internal seal against contaminants: the sliding contact between the lip 311 and the seat 125 provides that the latter cannot also be covered by the protective layer 50 and requires mechanical machining of the seat 125 to enhance the surface finish thereof. The outer shield 32 is angularly rigidly secured to the radially inner ring 12, in other words, rotates with the radially inner ring 12 about the axis X, and may include:

a cylindrical sleeve 321 made of metal, coaxial with the axis X, and fully fitted on the protective layer 50 in such a way as to also radially compress the protective layer 50 against the radially inner ring 12; and a transverse flange portion 322 rigidly secured to the sleeve 321 and provided, in correspondence with a free outer annular end 323 thereof, with a non-contacting lip 324 extending radially and axially towards the radially outer ring 11, in any case radially below a theoretical extension of the convex surface 11a.

The mounting substantially by interference of the outer shields 32 on the protective layer 50, and the assembly between the inner sealing shields 31 with the relative lips 311 and the radially inner ring 12, are easier to achieve when the protective layer 50 is fully arranged in the radial recesses 126. Moreover, the mounting by interference of the sleeves 321 on the layer 50 makes it all the more necessary that the polymeric material of the layer 50 have a high degree of hardness, which can be achieved as mentioned above with a Shore value of at least 80.

Lastly, to prevent the protective layer 50 from being in any way compromised by the mounting of the bearing unit 10 on the rotary shaft (not shown), especially by the insertion of the screws 22 in the relative holes 21, the layer 50 has, in correspondence with each hole 21, a respective hole 51, the dimensions of the inside diameter of which are equal to at least 105% of the dimensions of an outside diameter of the annular bevel 23: in this way, each hole 51 will have larger dimensions than the relative hole 21, and the rubbery material from which the protective layer 50 is made will never be pulled into the hole 21 during the operations of assembly and tightening of the screws 22. Although the layer 50 leaves an annular zone bordering the holes 21 partially uncovered, in other words not protected, it has been found during internal validation testing of the current embodiment of the disclosure that this annular zone is never a zone where corrosion starts, whereas the rounded annular edges 122 and the beveled annular edges 123 would be if they were not protected by the layer 50.

It is clear from the above that the protective layer 50 makes it possible to fully isolate and protect the radially inner ring 12 with the exception of the raceway 124 and the seats 125 that are, however, protected from the action of external contaminants by the presence of the sealing and protection device 30. In other words, by virtue of the innovative protective layer 50, in combination with the sealing and protection device 30, it is possible to use a stainless steel with a high carbon content to produce the radially inner ring 12, with all the advantages this provides in terms of the quality and wear resistance of the raceway 124 and also of the seats 125, while still providing a product which is fully compatible with use in the food and beverage industry: the bearing unit 10 may be subjected to countless washing and sanitation cycles without this in any way compromising or corroding the radially inner ring 12 through undesired corrosion of radially inner ring 12.

In addition to the embodiments of the disclosure as described herein, it is to be understood that there are numerous other variants. It is also to be understood that said embodiments are solely exemplary and do not limit the scope of the disclosure, its applications, or its possible configurations. On the contrary, although the above description enables those skilled in the art to apply the present disclosure in at least one exemplary configuration, it is to be understood that numerous variations of the described components may be devised, without thereby departing from the scope of the disclosure as defined in the appended claims, interpreted literally and/or according to their legal equivalents.

It should be noted that the use of particular terminology when describing certain features or embodiments of the disclosure should not be taken to imply that the terminology is being re-defined herein to be restricted to include any specific characteristics of the features or embodiments of the disclosure with which that terminology is associated. Terms and phrases used in this disclosure, and variations thereof, especially in the appended claims, unless otherwise expressly stated, should be construed as open-ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least"; the term "such as" should be interpreted as "such as, without limitation"; the term "includes" should be interpreted as "includes but is not limited to"; the term "example" is used to provide exemplary instances of the item in discussion, not an exhaustive or limiting list thereof, and should be interpreted as "example, but without limitation"; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

We claim:

1. A bearing unit, comprising:
   a radially outer ring stationary with respect to an axis of rotation (X);
   a radially inner ring rotatable with respect to the axis of rotation (X);
   a row of rolling bodies interposed between the radially outer ring and the radially inner ring;
   a gap between the radially outer ring and the radially inner ring;

a sealing and protection device mounted on the radially inner ring and mounted on opposite sides of the radially outer ring, wherein the sealing and protection device is configured to both protect the radially outer ring from the action of external contaminants and to prevent any such external contaminants from getting into the gap between the radially outer ring and the radially inner ring; and a protective layer arranged in contact with the radially inner ring, and made of composite polymeric material, wherein the protective layer is configured to isolate and protect the radially inner ring from external contaminants.

2. The bearing unit of claim 1, wherein the radially inner ring comprises a raceway for the rolling bodies, and two cylindrical mounting seats, wherein the cylindrical mounting seats are arranged on opposite sides of the raceway and are engaged by the sealing and protection device; wherein the protective layer covers, without interruption, the radially inner ring with the exception of the raceway for the rolling bodies and the two cylindrical mounting seats.

3. The bearing unit of claim 2, wherein the radially inner ring is delimited radially on the outside by two outer cylindrical surfaces, radially on the inside by an inner cylindrical surface, and axially by two annular surfaces; wherein the protective layer covers at least the inner cylindrical surface and the two annular surfaces.

4. The bearing unit of claim 3, wherein the protective layer further covers the two outer cylindrical surfaces.

5. The bearing unit of claim 4, wherein each of the two outer cylindrical surfaces comprises a respective radial recess with a radially outer diameter with dimensions smaller than the dimensions of a radially outer diameter of the cylindrical mounting seats.

6. The bearing unit of claim 5, wherein each respective radial recess comprises a depth less than or equal to the maximum uncompressed thickness of the protective layer.

7. The bearing unit of claim 6, wherein the sealing and protection device comprises a first shield mounted on the protective layer, adjacent to a respective cylindrical mounting seat; wherein the first shield comprises a cylindrical sleeve made of metal, and is configured to radially compress the protective layer against the radially inner ring.

8. The bearing unit of claim 7, wherein the sealing and protection device comprises a second shield connected directly to the radially outer ring and comprising a respective contacting lip arranged in contact with the respective cylindrical mounting seat.

9. The bearing unit of claim 5, wherein the protective layer comprises a thickness no greater than 0.2 mm.

10. The bearing unit of claim 5, wherein the protective layer is configured to be co-molded on the radially inner ring.

11. The bearing unit of claim 5, wherein the protective layer is configured to be deposited on the radially inner ring by spraying the composite polymeric material.

* * * * *